Patented Sept. 18, 1928.

1,684,732

UNITED STATES PATENT OFFICE.

WILLIAM HARRISON, OF MANCHESTER, ENGLAND.

MANUFACTURE OF CARBOHYDRATE DERIVATIVES.

No Drawing. Application filed November 3, 1927, Serial No. 230,919, and in Great Britain October 30, 1926.

It is known to react on viscose with ammonia and salts of ammonia, but the resulting compounds contain no nitrogen combined in the form of an amido or imido group or one or other of the nitrile groups, but only in the form of an ammonium group which is readily split off by treatment with acids.

Again, it is known to coagulate viscose in the form of threads by ammonium compounds in presence of a mineral acid, and it has been proposed to add to these co-agulating agents oxidizing agents to destroy the sulphur compounds, but in view of the fact that strong mineral acids are present the resulting threads contain no combined nitrogen because of the rapid separation of the CSS group from the cellulose both by the ammonium salt of a mineral acid and also by the mineral acid.

It is also known to react on compounds or derivatives of cellulose which contain the CSS group, for example, cellulose xanthogenate, with amines, such as aniline, or with the compounds containing the amido or imido group generally or such materials as form such compounds on decomposition.

According to the invention stable or permanent carbohydrate derivatives containing combined nitrogen in the form of an amido or imido group or one or other of the nitrile groups are obtained by subjecting to an oxidizing action a mixture or the product of admixture of a colloidal carbohydrate compound or compounds containing the CSS group and ammonia or a derivative of ammonia, preferably an organic derivative of ammonia, in which at least one hydrogen atom is free.

The reactions may be carried out in alkaline, neutral or faintly acid medium but not in a solution of such acidity as in itself will bring about decomposition of the compounds containing CSS by separating the CSS group from the cellulose; for example, in presence of excess of mineral acids, acid salts of mineral acids, or ammonium salts of mineral acids.

The compounds formed are derivatives of diimido carboxylic disulphide,

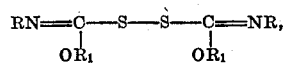

where R represents the radicle attached to the nitrogen atom of the ammonium derivative, and $R_1$ represents a residue of cellulose, starch or other colloidal carbohydrate.

Where a compound of cellulose is acted on by ammonia under the conditions described in this specification the product formed is most probably

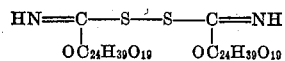

Again, when, for instance, viscose and aniline are acted on the compound formed is most probably

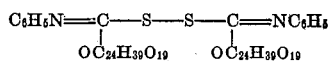

When, however, the reaction is carried out at a raised temperature, for example, at the boiling point of water, in an alkaline medium, other compounds are formed among which appear to be derivatives of benzothiazol

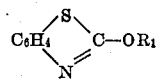

where $R_1$ is a residue of cellulose, starch or other colloidal carbohydrate.

The formulae given above are to be regarded only as illustrations.

The constitution of cellulose, starch and other colloidal carbohydrates being unknown, it is impossible to show exactly how the carbohydrate is combined with the derivatives of diimido carboxylic disulphide or benzothiazol or other compounds containing combined nitrogen and sulphur which may be produced according to the invention. It is quite possible that some form of union exists between the cellulose complexes attached to these compounds.

In this specification there are included as oxidizing agents all compounds or materials which have sufficient oxidizing capacity to oxidize hydrogen sulphide or its salts and compounds:—for example, bichromates, chlorates, hypochlorites, peroxides, ferricyanides and the like, nitrous acid, sulphurous acid, ferric salts, cupric salts, and atmospheric air or oxygen with or without the presence of oxidizing catalysts or oxygen carriers such as the oxides and salts of copper, cobalt, iron, manganese, nickel and the like.

As an oxidizing means there may be used electrolysis or other process employing electricity.

Particularly suitable nitrogenous compounds or derivatives of ammonia are amino compounds such as methylamine, ethylamine, aniline, toluidine, benzylamine, naphthylamine, amino phenols, amino naphtols, etc., diamines such as ethylene diamine, benzidine, diamidodiphenylmethane, and phenyl hydrazine.

Under certain conditions the by-products usually contained in the xanthogenates of cellulose, starch and other colloidal carbohydrates are converted partially into sulphur by the action of the oxidizing agents or means. This sulphur may be removed from the final nitrogen-containing carbohydrate compound by treatment with any of the known solvents for sulphur, preferably those not of alkaline type, for example acetone, carbon disulphide, sodium sulphite and the like either during or after formation.

Since many of these by-products are decomposed by acids, the amount of oxidizing agent needed is generally less if the reaction is carried out in faintly acid solution.

*Example I.*

1000 parts of viscose or of starch xanthogenate containing 100 parts of cellulose or starch are diluted with 2000 to 10000 parts of water. 30 parts of aniline are well stirred in and to the mixture are added while stirring vigorously 2000 parts of a 10% solution of potassium ferricyanide. The mass soon sets to a jelly which is made acid with dilute sulphuric acid, separated out and washed.

The product is obtained in the form of a paste which, on drying, forms a hard mass which may be reduced to a powder, which is soluble in caustic soda, is swollen by but does not dissolve in ammonia or in alkylated or arylated amines. The product is swollen by aqueous pyridine but does not dissolve therein.

Analysis shows that the amount of combined nitrogen is usually about but not more than one atom of nitrogen to four $C_6H_{10}O_5$ groupings.

*Example II.*

As Example I, excepting that the reaction is commenced at 60° C., and after mixing heated up to 100° C., with a further addition of 1000 parts of 10% ferricyanide solution, the heating being continued for some hours.

The product separates out on acidification as a brownish colloidal precipitate most probably containing derivatives of benzothiazol. The product is soluble in caustic soda.

*Example III.*

As Example I, excepting that before the addition of aniline the xanthogenate is neutralized with a 10% solution of acetic acid or equivalent amount of carbonic acid, sulphurous acid, or phosphoric acid with rapid stirring. The amount of potassium ferricyanide may then be reduced to 1200–2000 parts of 10% solution or even less.

*Example IV.*

1000 parts of viscose or xanthogenate of starch or other colloidal carbohydrates are diluted with 1000–10000 parts of water, neutralized with 10% acetic acid 500–600 parts and mixed with 20 parts of urea. To the mixture at room temperature are added with rapid stirring 4000 to 10000 parts of a solution of sodium hypochlorite containing 3.5 per cent of active chlorine.

The product separates out as a curdy precipitate soluble in caustic soda.

*Example V.*

As in one or other of the Examples I–IV, excepting that there is used as oxidizing agent another substance capable of oxidizing hydrogen sulphide such as atmospheric air or oxygen, preferably in presence of an oxidizing catalyst or oxygen carrier such as colloidal manganese dioxide.

*Example VI.*

As in one or other of the Examples I–IV excepting that the oxidation is carried out by means or electrolysis.

*Example VII.*

As in one or other of the Examples I–VI excepting that in place of viscose or starch xanthogenate there is used another compound of cellulose, starch or other colloidal carbohydrate containing the CSS group.

*Example VIII.*

As in Examples I–VII excepting that either during or after formation of the carbohydrate compound the product is treated with one or other of the known solvents for sulphur such as carbon disulphide, acetone, sodium sulphite or the like.

*Example IX.*

As in Examples I–VIII excepting that in place of aniline or urea there is used the corresponding amount of another compound containing the amido or imido group.

*Example X.*

1000 parts of viscose or xanthogenate of starch or other colloidal carbohydrate are diluted with 2000–10000 parts of water mixed with 40–400 parts of 25% ammonia and 1000–4000 parts of a 10% solution of potassium ferricyanide. The mixture is well stirred and allowed to stand. After some hours the product separates as a curdy precipitate which may be washed directly or after standing for some days or acidified before or after washing. The product is soluble in caustic soda solution from which it may be precipitated by means of any compound capable of neutralizing caustic alkalies in the form of films or filaments or the like.

Example XI.

As Example X excepting that in place of ammonia there is used hydroxylamine or other inorganic derivative of ammonia.

Example XII.

100 parts of cellulose dixanthogenate prepared in the form of a freshly prepared paste in water say 2000–10000 parts, are treated with 40–400 parts of 25% ammonia; as soon as swelling of the dixanthogen has taken place there are added 1000–3000 parts of 10% potassium ferricyanide, when the product rapidly separates out as a curdy precipitate which is washed or treated with acid and washed.

The products obtained according to the invention are suitable for the manufacture of films, filaments, filling materials and the like. Solutions of compounds soluble in caustic alkalies may be coagulated in the form of films, filaments or other form by means of any substance capable of neutralizing the caustic alkali and rendering it non-caustic. Such compounds as are insoluble in caustic alkalies may be dissolved by other suitable solvents such as the well-known cellulose solvents, namely, zinc chloride, sulphuric acid, ammoniacal copper solution and the like and converted into films, filaments or other form by any of the known methods.

What I claim is:—

1. The manufacture of carbohydrate derivatives by subjecting to an oxidizing action in a substantially neutral medium a colloidal carbohydrate compound containing the CSS group admixed with a nitrogen hydrogen compound in which at least one hydrogen atom is free.

2. The manufacture of carbohydrate derivatives by subjecting to an oxidizing action in a substantially neutral medium a mixture of a colloidal carbohydrate compound containing the CSS group and an organic derivative of ammonia in which at least one hydrogen atom is free.

3. A carbohydrate derivative of diimido disulphide of the general formula

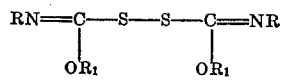

where R represents a radicle attached to a nitrogen atom and $R_1$ represents a residue of a colloidal carbohydrate.

In testimony whereof I have signed my name to this specification.

WILLIAM HARRISON.